United States Patent [19]
Pfenning et al.

[11] Patent Number: 5,528,973
[45] Date of Patent: Jun. 25, 1996

[54] HIGH POWER COAXIAL CONNECTION

[75] Inventors: Thomas M. Pfenning, Little Canada; Charalampos D. Marinos, Minneapolis; Chris S. Sorenson, Edina, all of Minn.

[73] Assignee: FMC Corp., Chicago, Ill.

[21] Appl. No.: 192,895

[22] Filed: Feb. 7, 1994

[51] Int. Cl.⁶ ............................................. F41B 6/00
[52] U.S. Cl. .............................. 89/8; 439/579; 439/584
[58] Field of Search ..................... 89/8; 124/3; 439/574, 439/580, 583, 584

[56] References Cited

U.S. PATENT DOCUMENTS

| | | | |
|---|---|---|---|
| 2,906,809 | 9/1959 | Drenning | 439/583 |
| 3,251,216 | 5/1966 | Broske et al. | 102/202.9 |
| 5,220,126 | 6/1993 | Borgwarth et al. | 89/28.05 |
| 5,231,242 | 7/1993 | Chryssomallis et al. | 89/8 |
| 5,304,739 | 4/1994 | Klug et al. | 174/102 R |

OTHER PUBLICATIONS

Holler, Walker W., Glossary of Ordnance Terms, Jun. 1959, p. 48.

*Primary Examiner*—Stephen C. Bentley

[57] ABSTRACT

Apparatus is disclosed which provides coaxial connection between a high energy power supply and a plurality of plasma injectors in a gun breech assembly over a plurality of high energy transmission coaxial cables without losing the coaxial nature of the high energy transmission path at the connections between the coaxial cables and the plasma injectors. The apparatus includes a conductive bell housing for surrounding the connections while providing access for securing the connections with the bell housing in place.

8 Claims, 5 Drawing Sheets

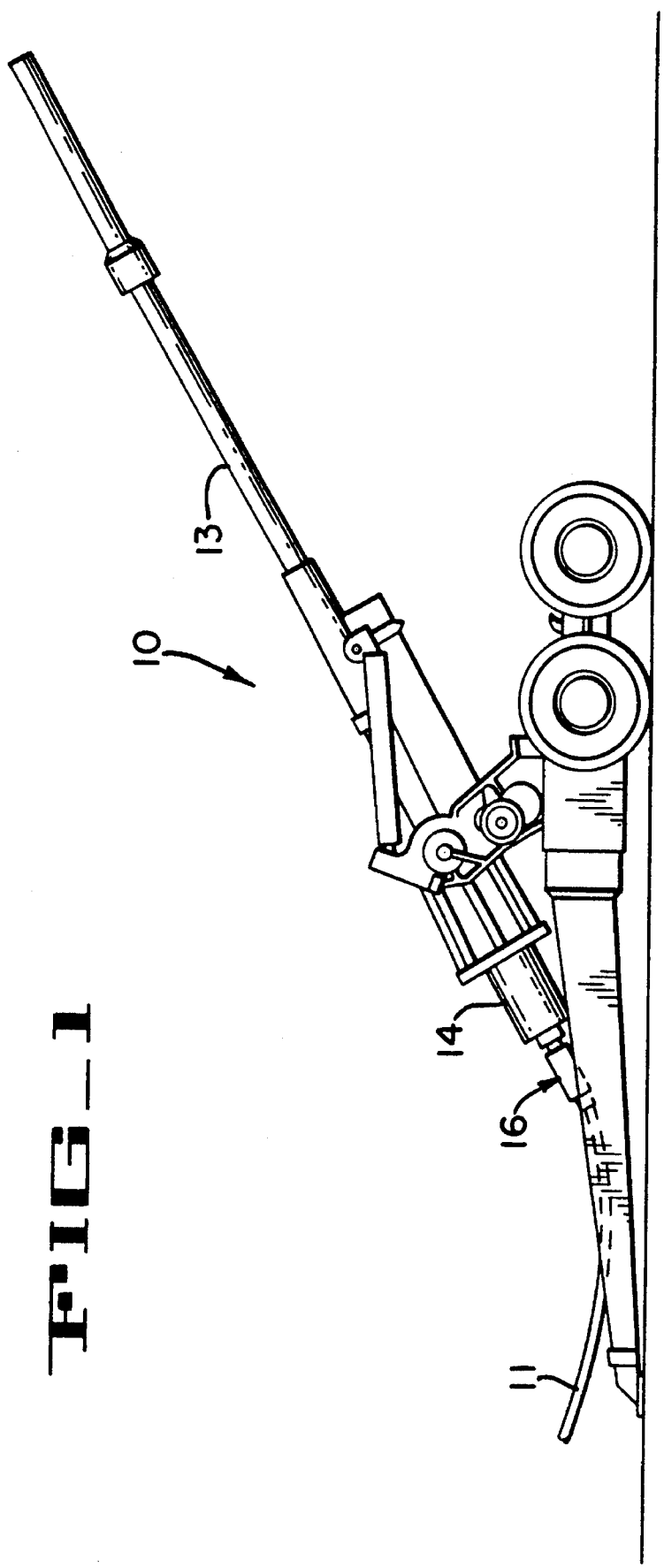

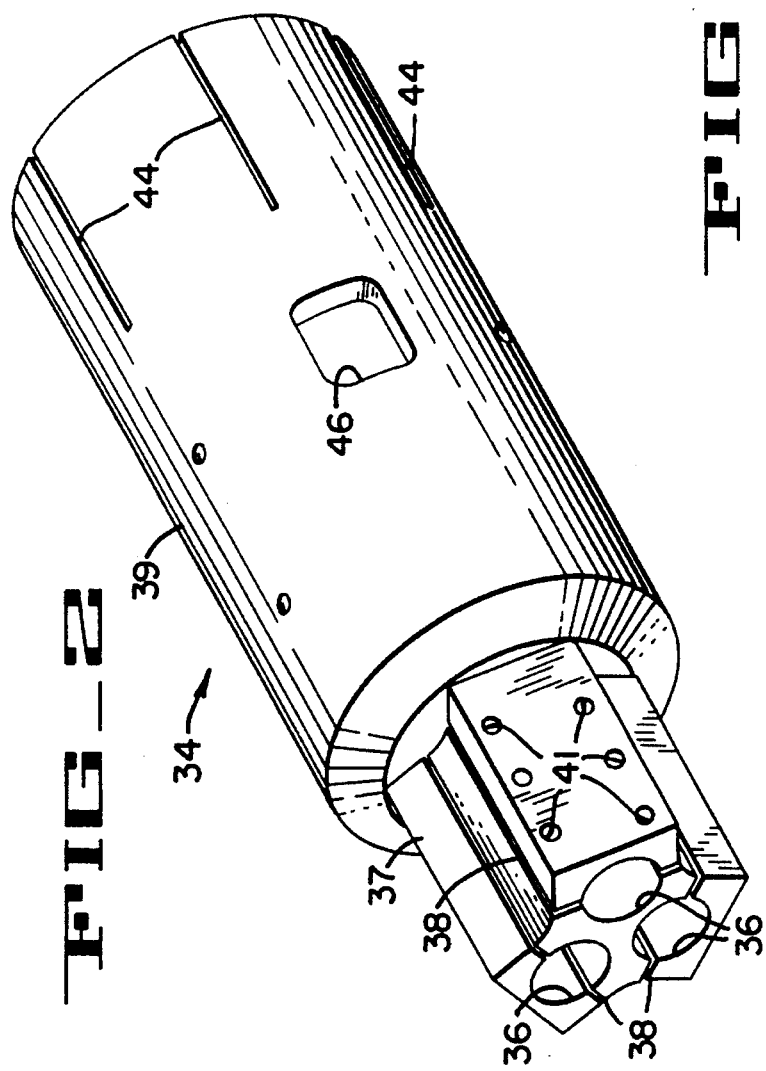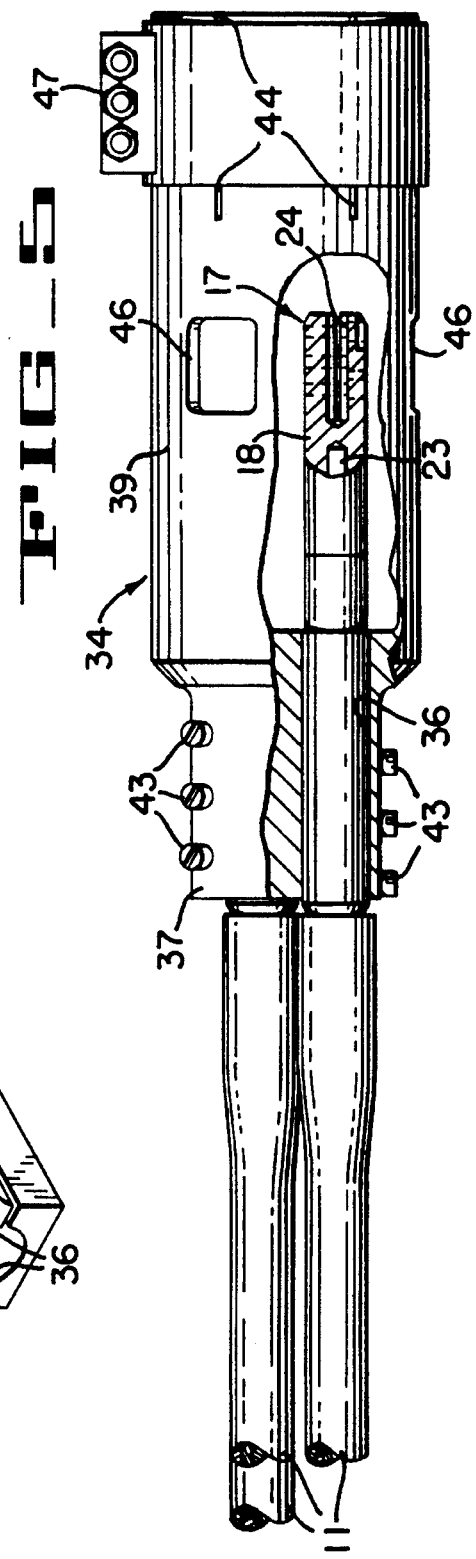

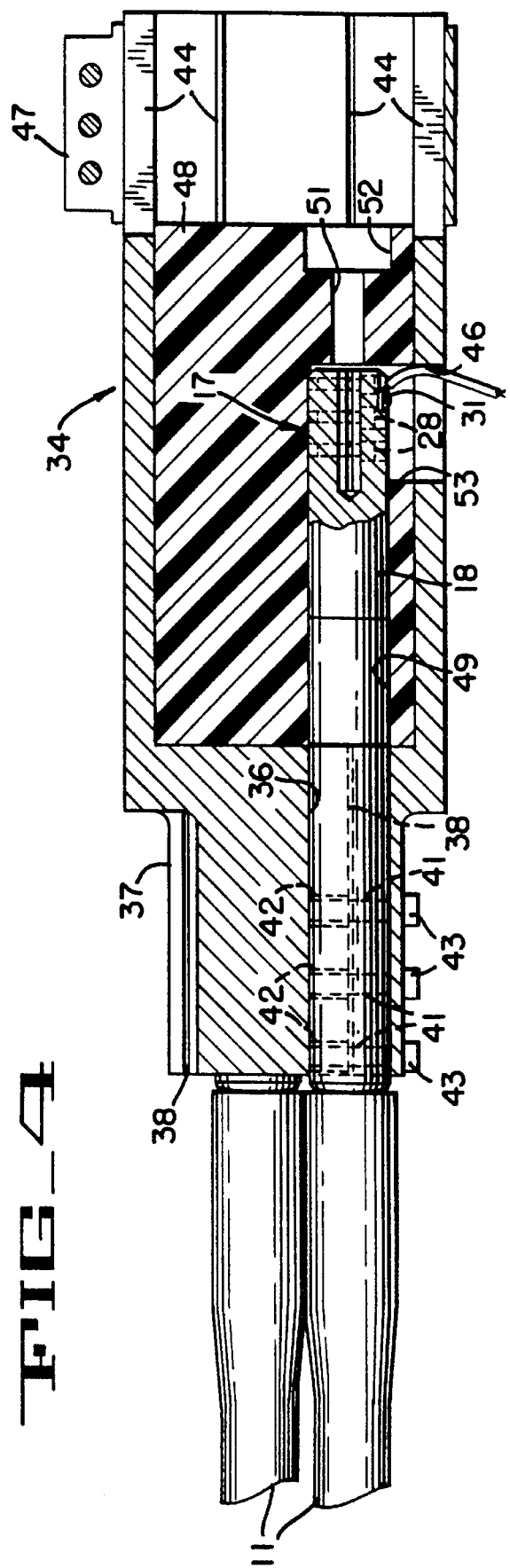
FIG_4

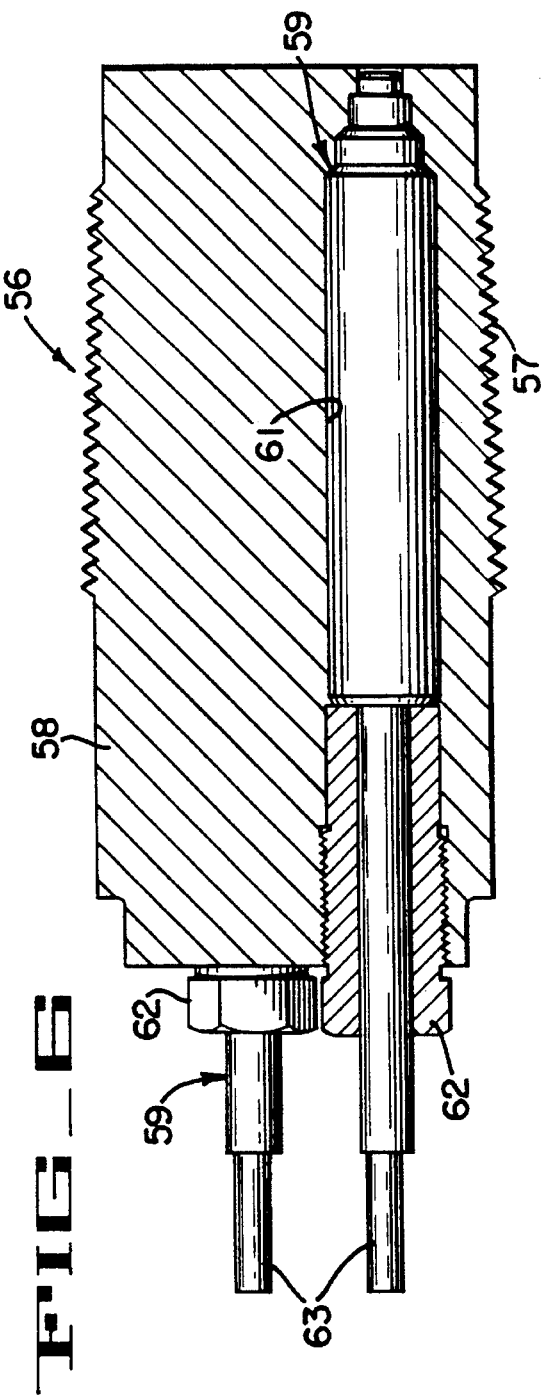
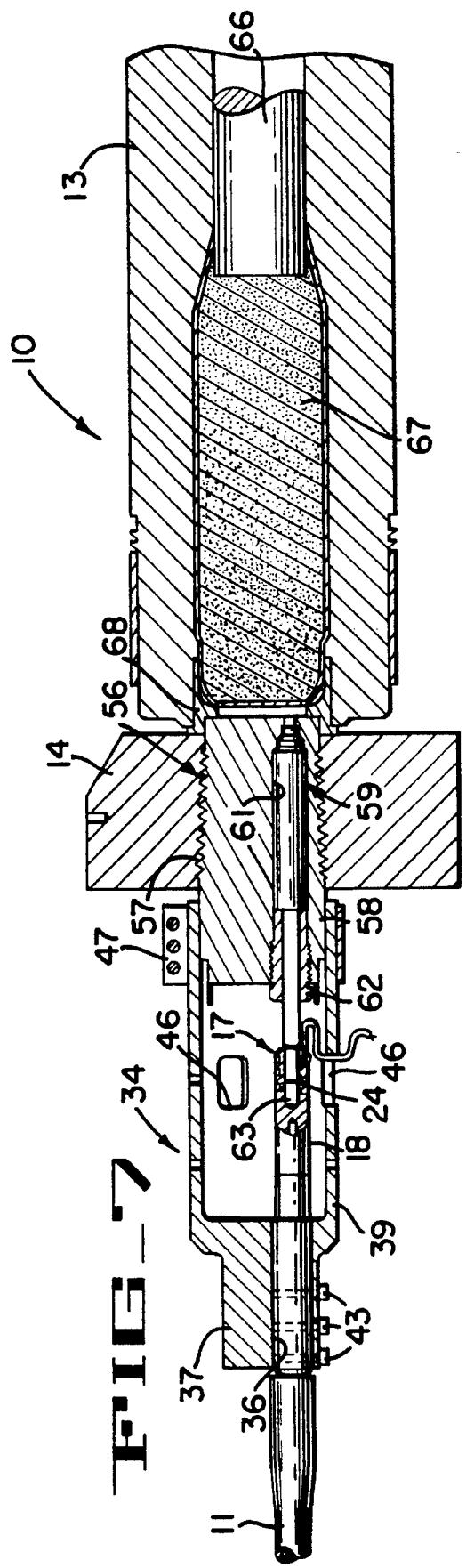

HIGH POWER COAXIAL CONNECTION

SUMMARY OF THE INVENTION

A gun system has a breechblock, a gun tube adjacent the breechblock for receiving an ammunition assembly therewithin, and a remote high energy power supply. The system includes a housing having first and second open ends, a breech insert and plasma injector assembly having at least one plasma injector therein, wherein the last named assembly is configured to be retained at one end in the breechblock adjacent the ammunition assembly and to extend from the breechblock at a remote end. At least one high energy coaxial cable has a gun end and a remote end, wherein a gun end connector is attached to the coaxial cable gun end which is connected electrically to the high energy power supply at the remote end. Means is provided on the first open end of the housing for receiving and securing the coaxial cable gun end therein and the housing has at least one side opening therein providing access to the gun end connector for securing the gun end connector to the plasma injector. A solid insulator surrounds the gun end connector within the housing and has a side opening aligned with the housing side opening. Means is provided on the second open end of the housing for receiving and securing the remote end of the breech insert and plasma injector assembly therein, so that when the gun end connector is secured to the plasma injector high power is transferable from the remote power supply to the plasma injector for firing the ammunition assembly from the gun tube.

In another aspect of the invention an interface between the gun breechblock and a high energy power supply is provided. At least one high energy transmission coaxial cable is provided wherein the cable has a remote end connected to the high energy power supply and a gun connector end. An interface housing is included having first and second open ends. First receiving securing means is provided on the interface housing first open end for receiving and securing the coaxial cable gun connector end. A solid insulator is disposed within the interface housing and surrounds the gun connector end. A breech insert and plasma injector assembly is configured to extend between the gun breech and the interface housing second end. Second receiving and securing means is provided on the interface housing second open end for receiving and securing the breech insert and plasma injector assembly in electrical contact with the gun connector end within the interface housing second end. The interface housing and the solid insulator have aligned radially extending openings therein for providing access to the second receiving and securing means positioned within the housing.

The invention relates to apparatus for securing a gun end of a high energy transmission coaxial cable to a plasma injector in a breech insert assembly for both an electrothermal chemical and a combustion augmented plasma gun. An interface housing is provided having first and second open ends. Means is present at the first open end for receiving and securing the high energy transmission coaxial cable within the interface housing. A solid insulator is disposed within the interface housing second opened end surrounding the gun end of the coaxial cable. Further means is provided for securing the coaxial cable in electrical contact with the plasma injector within the second open end of the interface housing. The interface housing and solid insulator an have aligned set of openings therein for providing lateral access to the means for securing the coaxial cable in electrical contact.

The invention relates to apparatus for maintaining the coaxial character of a high energy transmission path between a high energy power supply and a high energy consumption circuit. A high energy transmission coaxial cable is included with a high energy consumption circuit having accessible electrical circuit contacts. A rigid conducting housing has open first and second ends, wherein first means disposed at said open first end is provided for receiving and securing one end of the high energy coaxial cable within the rigid conducting housing. Solid insulation means is disposed within the rigid conducting housing and surrounds the one end of the coaxial cable. Second means is disposed at the open second end for securing the accessible electrical contacts on the high energy consumption circuit in electrical contact with the high energy transmission coaxial cable. The rigid conducting housing and the solid insulation means have at least one set of additional aligned opening therein for providing access to the second means for securing.

BRIEF DESCRIPTION OF A DRAWINGS

FIG. 1 is an elevation view of a combustion augmented plasma gun or an electro-thermal chemical gun incorporating the subject matter of the present invention.

FIG. 2 is a respective view of the housing of the present invention.

FIG. 4 is a section view of the housing and coaxial cables of the present invention.

FIG. 5 is a partial section of the high power electrical interface of the present invention.

FIG. 6 is a side elevation with portions broken away of a breech insert and plasma injector assembly utilized in the present invention.

FIG. 7 is a section of the present invention coupled between a high energy power supply and an electrothermal chemical or combustion augmented plasma gun.

DESCRIPTION OF THE PREFERRED EMBODIMENT

Figure 3:
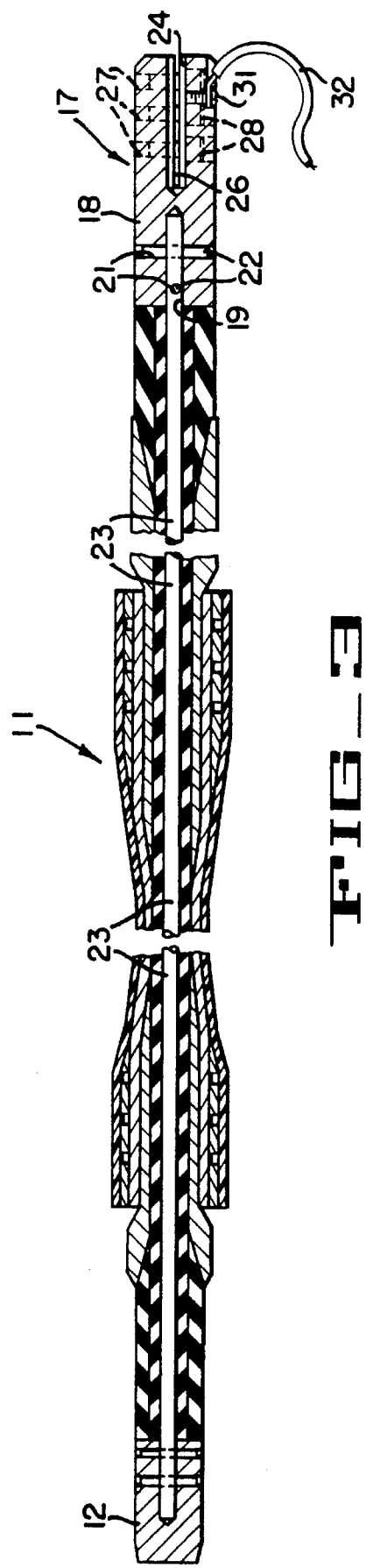
FIG. 3 is a section view of a coaxial cable for use in the present invention.

Electrothermal chemical (ETC) and combustion augmented plasma ($CAP_{tm}$) guns require large energy levels to initiate firing. Such energy levels must be transferred to the gun in very short periods of time resulting in large electrical currents. It is not uncommon for such guns to require several hundred thousand amperes for firing. Difficulty is encountered with such large electrical currents through conductors connecting a pulse power supply to the gun without destroying the conductors. Destruction of conductors under these circumstances is due to the strong magnetic forces generated by the large electrical currents. Several conductor configurations have been used in the past to conduct these required high current levels. One conductor configuration is the coaxial configuration, wherein current is transmitted in one direction over one of the coaxial conductors and a return path is provided over the other coaxial conductor. The advantage of the coaxial configuration is that the magnetic field outside the conductor is nil. Thus, no magnetic forces are exerted on any metallic object in the immediate surroundings of the coaxial cable. However, the space in between the two coaxial conductors experiences a very strong magnetic field. This results in a high magnetic pressure exerted outward on the outer coaxial conductor on every element thereof. The outer conductor, as a result, may be literally "blown out" when the coaxial cable is required to carry currents at levels of several hundred thousand amperes.

When a large ETC or $CAP_{tm}$ gun such as the one shown at 10 in FIG. 1 of the drawings is fired, it may recoil to several feet or more. Therefore inflexible coaxial energy transfer lines cannot be used. Consequently, a flexible high energy coaxial cable such as that shown at 11 in FIG. 1 is required. Such a high energy flexible coaxial cable with end connections is described and shown in copending patent application Ser. No. 08/051,909, filed Apr. 26, 1993 in the United States Patent Office, entitled "High Energy Flexible Coaxial Cable and Connections" and assigned to the assignee of the invention disclosed herein. The disclosure therein is incorporated herein by reference and only a brief description of that coaxial cable will be set forth which is sufficient to clearly describe its role in conjunction with the present invention.

The coaxial cable of FIG. 3 is capable of carrying the current levels of several hundred thousand amperes without suffering mechanical damage from the aforementioned magnetic pressures which are set up within the cable. Further, the coaxial cable of FIG. 3 is sufficiently flexible so that it may be used in ETC and $CAP_{tm}$ gun firing applications. A power supply end connector, shown generally at 12, is connected electrically to a remote power supply (not shown) which supplies the current necessary to fire a projectile from the gun tube 13 of FIG. 1. The gun tube has a breechblock 14 located at the after end thereof. The invention disclosed and claimed herein is shown generally at 16 and will hereinafter be described.

The coaxial cable 11 also has a gun end connector 17, as seen in FIG. 3, which comprises a connector probe 18 having a bore 19 in one end thereof. A pair of holes 21 are drilled through two diameters of the gun end connector probe 18 as well as through a high current center conductor 23 and a pin 22 is inserted in each of the holes 21 to fit tightly therein and secure the gun end of the high current center conductor 23 within the gun end connector probe 18. An additional bore 24 is drilled along the axis of the gun end connector probe at the end thereof opposite the end having the bore 19 therein. A slot 26 is cut across the diameter of the gun end connector probe 18 for the length of the bore 24 and a series of threaded holes 27 is placed on each side of, but spaced from the axis of the gun end connector probe, to receive screws 28 extending through aligned clearance holes 29. As a result, a conducting end of a plasma injector may be inserted in the end bore 24, as will be hereinafter described, and clamped into the gun end connector probe 18 by advancing the screws 28 in the threads 27. A temporary hold set screw 31, having a purpose also to be hereinafter described, is shown inserted in a threaded hole in the gun end connector probe 18. An insulated wire voltage probe 32 is shown attached to the gun end connector probe for monitoring purposes. It should be noted here that the invention disclosed herein relates to a permanently attached high energy power conducting path between a high energy power supply and the breech of an ETC or $CAP_{tm}$ gun rather than the temporary or intermittent power connection provided as disclosed in U.S. Pat. No. 5,220,126, Borgwash et al assigned to the assignee of record in this disclosure.

The manner in which the permanent attachment is made between the high energy power supply (not shown) and the gun breechblock 14 resides in the interface provided by the invention described herein. The high energy which must be transmitted between the power supply and the gun breech may require one or multiple coaxial cables 11 in the conducting path depending on the energy level required. In the embodiment described now, an energy conducting path having three coaxial cables therein will be described by way of example, any number of such coaxial cables being included in the inventive concept from one to as many as six or seven such cables, again depending on the level of energy which must be transferred to fire the projectile from the gun tube 13 of FIG. 1.

As seen in FIG. 2 of the drawings, a housing, sometimes referred to as a bell housing 34, is shown wherein one open end of the housing has three bores 36 formed therein which are sufficient to each allow passage of the outside diameter of the gun end 17 of the flexible coaxial cable 11 shown in FIG. 3. The bores 36 are formed through an end boss 37 formed at one end of the bell housing 34 As may be seen in FIG. 2, the boss 37 at each of the bores 36 is slotted at 38 across a diameter thereof and along tile length thereof. The slots terminate at the beginning of a large diameter 39 on the bell housing 34. A series of clearance holes three on each side of each bore 36, is provided which are aligned with a like number of threaded holes 42 shown in FIG. 4, so that bolts 43 having mating threads may be inserted therein and drawn up to compress the slots 38 and thereby secure the gun end 17 of each coaxial cable 11 which is inserted through each bore 36 and received within the bell housing 34.

With further reference to FIG. 2 of the drawings, it may be seen that the end of the bell housing 34 opposite the end upon which the boss 37 is formed has a series of axially extending slots 44 cut through the large diameter 39 of the bell housing. The large diameter 39 is the outside surface of a wall at the other open end of the bell housing. These slots serve to provide compression of the wall bounded by the large diameter 39 of the bell housing for clamping purposes as will be hereinafter described. Further, the wall at the large diameter 39 of the bell housing 34 has a series of openings or windows 46 cut therethrough, one for each of the bores 36. One of such openings only is shown in FIG. 2. Two of such openings 46 may be seen in the depiction of FIG. 5, wherein it may be seen that the bottom opening 46 of FIG. 5 provides access to the gun end connector probe 18 on the end of the coaxial cable 11 which is visible in the cut away portion of the view of FIG. 5. A clamp 47 is shown surrounding the large diameter 39 on the open end of the bell housing 34 opposite from that on which the boss 37 is formed. The clamp 47 serves a purpose to be hereinafter described.

Returning now to FIG. 4 of the drawings, the manner in which the coaxial cables 11 enter the bell housing 34 through the bores 36 is clearly shown, as is the manner in which those coaxial cables are clamped within the bores 36 by means of the bolts 43 engaging the threads 42 as mentioned hereinbefore. When the bolts 43 are advanced in the threads 42 the width of slot 38 is diminished and the walls of the bore 36 tightly engage the outside diameter of the coaxial cable 11 lying therewithin. A cylindrically shaped dielectric member 48 is formed to fit within the inside diameter of the wall bounded by the large diameter portion 39 of the bell housing 34. The dielectric member 48 has bores 49 extending axially in alignment with each of the bores 36 in the boss 37 on the bell housing. The bores 49 may therefore be seen to each receive the gun end connector probe 18 on a coaxial cable 11. A smaller bore 51 is formed through the end of the dielectric member 48 in alignment with the bores 49. The hole 51 is counterbored at 52 as may be seen in FIG. 4. The window 46 in the bell housing 34 has a mating window 53 in each instance formed in the dielectric member 48. The purpose of these aligned openings or windows 46 and 53 is to provide access to the temporary hold set screw 31 and clamping screws 28 initially mentioned in FIG. 3 and shown here again in FIG. 4.

FIG. 6 shows a breech insert and plasma injector assembly 56 which, in this embodiment has an array of threads 57 along one end of the outside diameter thereof and which has a smooth outside diameter 58 on the remainder thereof. The diameter 58 fits within the inside diameter of the wall bounded by the large diameter 39 of the bell housing 34. In the example described herein, the breech insert 56 carries three plasma injectors 59 (two of which are visible in FIG. 6) within bores 61 formed in the breech insert 58 and which are retained within the bores 61 by means of a threaded plug 62 in each instance. The plasma injectors 59 have an end which extends through an axial bore in each plug 62. At the extended ends of each of the plasma injectors 59 is an electrical contact member 63 which is sized to fit within the bore 24 formed in the gun end connector probe 18 shown in the previous figures. As a result, the breech insert and plasma injector assembly 56 may be threaded into the breech block 14, as seen in FIG. 7, and the extending portion 58 of the assembly 56 may be received in the inside diameter of the wall bounded by the large diameter larger portion 39 of the bell housing 34. The extending portion 58 of the assembly 56 is clamped within the bell housing 34 open end by tightening the bolts shown in section on the clamp 47, thereby diminishing the width of the slots 44 and tightly engaging the portion 58. The connection extensions 63 of the plasma injectors 59 are passed through the bore 51 and are engaged in the bore 24 in individual ones of the gun end connector probes 18, as also seen in FIG. 7. The dielectric member 48 is removed from the depiction of FIG. 7 for purposes of clarity.

It may therefore be seen that access is provided through the openings or windows 46 in the bell housing 34 to reach the bolts 28 in the gun end connector probe 18 so that when bolts 28 are advanced in threads 27 the plasma injector connector extension 63 is firmly and fixedly engaged by the connector probe 18. As a result, the coaxial cables 11, the bell housing 34 and the breech insert and plasma injector assembly 56 are firmly held together at the breechblock 14 of the ETC or CAP$_{tm}$ gun 10 without losing the coaxial nature of the conducting path in the area within the bell housing 34 where the connection is made between the gun end of the coaxial cable 11 and the plasma injectors 59. Access is provided for making such fixed connections by the windows 46 in the bell housing 34 and 53 in the dielectric member 48 so that as many coaxial cables 11 are in place as are deemed necessary to coaxially deliver the required energy level to the breech of the gun 10.

A projectile 66 within the gun tube 13 is supported at the breech end of the gun tube by a propellant charge 67 and a stub case 68. The propellant is ignited by the plasma injectors 59 to propel the projectile 66 from the gun tube.

Although the best mode contemplated for carrying out the disclosed invention has been herein shown and described, it will be apparent that modifications, variations, additions or omissions may be made without departing from what is considered to be the substance and subject matter of the invention.

What is claimed is:

1. A gun system having a breechblock, a gun tube adjacent the breechblock for receiving an ammunition assembly therewithin, and having a remote high energy power supply, comprising:

a housing having first and second open ends, a breech insert and plasma injector assembly having at least one plasma injector therein and being configured to be retained at one end in the breechblock adjacent the ammunition assembly and extending from the breechblock at a remote end, at least one high energy coaxial cable having a gun end and a remote end, a gun end connector on said high energy coaxial cable gun end and being connected to the high energy power supply at said remote end, means on said first open end of said housing for receiving and securing said coaxial cable gun end therein, solid insulation means disposed within said housing and surrounding said gun end connector.

said housing and solid insulation means having at least one set of aligned side openings therein providing access to said gun end connector for securing said gun end connector to said plasma injector, and means on said second open end of said housing for receiving and securing said remote end of said breech insert and plasma injector assembly therein, whereby said gun end connector is secured to said plasma injector, and whereby high power is transferable through a continuous coaxial path from the remote power supply to said plasma injector for firing the ammunition assembly from the gun tube.

2. A gun system as in claim 1 wherein said breech insert and plasma injector assembly comprises a plurality of plasma injectors, said at least one high energy coaxial cable comprises a plurality of high energy coaxial cables, and said housing and solid insulation means have a plurality of sets of said side openings therein.

3. An interface between a gun breechblock and a high energy power supply comprising:

at least one high energy transmission coaxial cable having a remote end connected to the high energy power supply and having a gun connector end, an interface housing having first and second open ends, first receiving and securing means on said interface housing first open end for receiving and securing said coaxial cable gun connector end, solid insulation means disposed within said interface housing and surrounding said gun connector end, a breech insert and plasma injector assembly configured to extend between the gun breechblock and said interface housing second open end, second receiving and securing means on said interface housing second open end for receiving and securing said breech insert and plasma injector assembly in electrical contact with said gun connector end within said interface housing second end, and said interface housing and said solid insulation means having aligned radially extending openings therein for providing access to said second receiving and securing means.

4. An interface as in claim 3 wherein said at least one high energy transmission coaxial cable comprises a plurality of coaxial cables, and wherein said aligned radially extending openings comprise a plurality of aligned radially extending openings.

5. Apparatus for securing a gun end of a high energy transmission coaxial cable to a plasma injector in a breech insert assembly for both an electro-thermal chemical and a combustion augmented plasma gun, comprising:

an interface housing having first and second open ends, means in said first open end for receiving and securing the high energy transmission coaxial cable within said interface housing, solid insulation means disposed within said interface housing second open end for surrounding the gun and of the coaxial cable, and means for securing the coaxial cable in electrical contact with the plasma injector within said second open end of said interface housing, said interface housing and solid insulation means having an aligned set of openings therein for providing lateral access to said means for securing the coaxial cable in electrical contact.

6. Apparatus as in claim 5 wherein the high energy transmission coaxial cable comprises a plurality of coaxial cables, wherein said means in said first open end comprises means for receiving and securing a plurality of high energy transmission coaxial cables, the breech insert assembly comprising a plurality of plasma injectors, wherein said interface housing and solid insulation means have a plurality of aligned sets of openings therein, and wherein said means for securing the coaxial cable in electrical contact comprises a plurality of the last named means, accessible through ones of said aligned sets of openings whereby an increased level of energy is transferable to the breech insert assembly.

7. Apparatus for maintaining coaxial character of a high energy transmission path between a high energy power supply and a high energy consumption circuit comprising:

a high energy transmission coaxial cable, a high energy consumption circuit having accessible electrical contacts, a rigid conducting housing having open first and second ends, first means disposed at said first open end for receiving and securing one end of said high energy coaxial cable within said rigid conducting housing, solid insulation means disposed within said rigid conducting housing for surrounding said one end of said high energy coaxial cable, second means disposed at said second open end for securing said accessible electrical contacts on said high energy consumption circuit in electrical contact with said high energy transmission coaxial cable, and said rigid conducting housing and said solid insulation means having at least one set of additional aligned openings therein for providing access to said second means for securing.

8. Apparatus for maintaining coaxial character as in claim 7 wherein said high energy transmission coaxial cable comprises a plurality of coaxial cables, said first means comprising means for receiving and securing one end of said plurality of coaxial cables, said second means comprising means for securing a plurality of accessible electrical contacts on said high energy consumption circuit with said plurality of coaxial cables; and said at least one set of additional aligned plurality of sets of additional aligned openings.

* * * * *